(12) United States Patent
Jeppesen

(10) Patent No.: US 6,362,552 B1
(45) Date of Patent: Mar. 26, 2002

(54) ELECTRIC MOTOR ROTOR

(75) Inventor: Gregory C. Jeppesen, 3773 Indian Trail, Orchard Lake, MI (US) 48324

(73) Assignee: Gregory C. Jeppesen, Orchard Lake, MI (US)

(*) Notice: Subject to any disclaimer, the term of this patent is extended or adjusted under 35 U.S.C. 154(b) by 0 days.

(21) Appl. No.: 09/609,888

(22) Filed: Jul. 5, 2000

Related U.S. Application Data

(60) Provisional application No. 60/142,368, filed on Jul. 6, 1999.

(51) Int. Cl.[7] .............................. H02K 1/22; H02K 17/16
(52) U.S. Cl. ..................... 310/216; 310/211; 310/261
(58) Field of Search ................................. 310/211, 212, 310/215, 216, 217, 261

(56) References Cited

U.S. PATENT DOCUMENTS

| | | | | |
|---|---|---|---|---|
| 2,794,138 A | * | 5/1957 | Dunn | 310/216 |
| 3,401,280 A | * | 9/1968 | Lackey et al. | 310/216 |
| 4,311,932 A | | 1/1982 | Olson | 310/61 |
| 4,782,260 A | * | 11/1988 | Ganhdi et al. | 310/216 |

FOREIGN PATENT DOCUMENTS

| | | | | |
|---|---|---|---|---|
| JP | 355061250 A | 5/1980 | | 1/6 |
| JP | 10150736 A | 6/1998 | | 1/26 |

* cited by examiner

*Primary Examiner*—Burton S. Mullins
(74) *Attorney, Agent, or Firm*—Dinnin & Dunn P.C

(57) ABSTRACT

A novel electric motor rotor has a plurality of laminate discs 20 having a central aperture 22 and a plurality of slots 30 therein for acceptance of a plurality of electrically conductive bars 50. The slots 30 have a radially outwardly extending tab 34 protruding from a radially inner surface for positioning the conductive bars 50. Additionally, the slots 30 have a radially outer surface 40 having a pair of radiused sections 42 for bearing the centrifugal force of the conductive bars 50 as the rotor 10 spins, and a relieved bridge section 44 for enhanced electromagnetic properties.

6 Claims, 1 Drawing Sheet

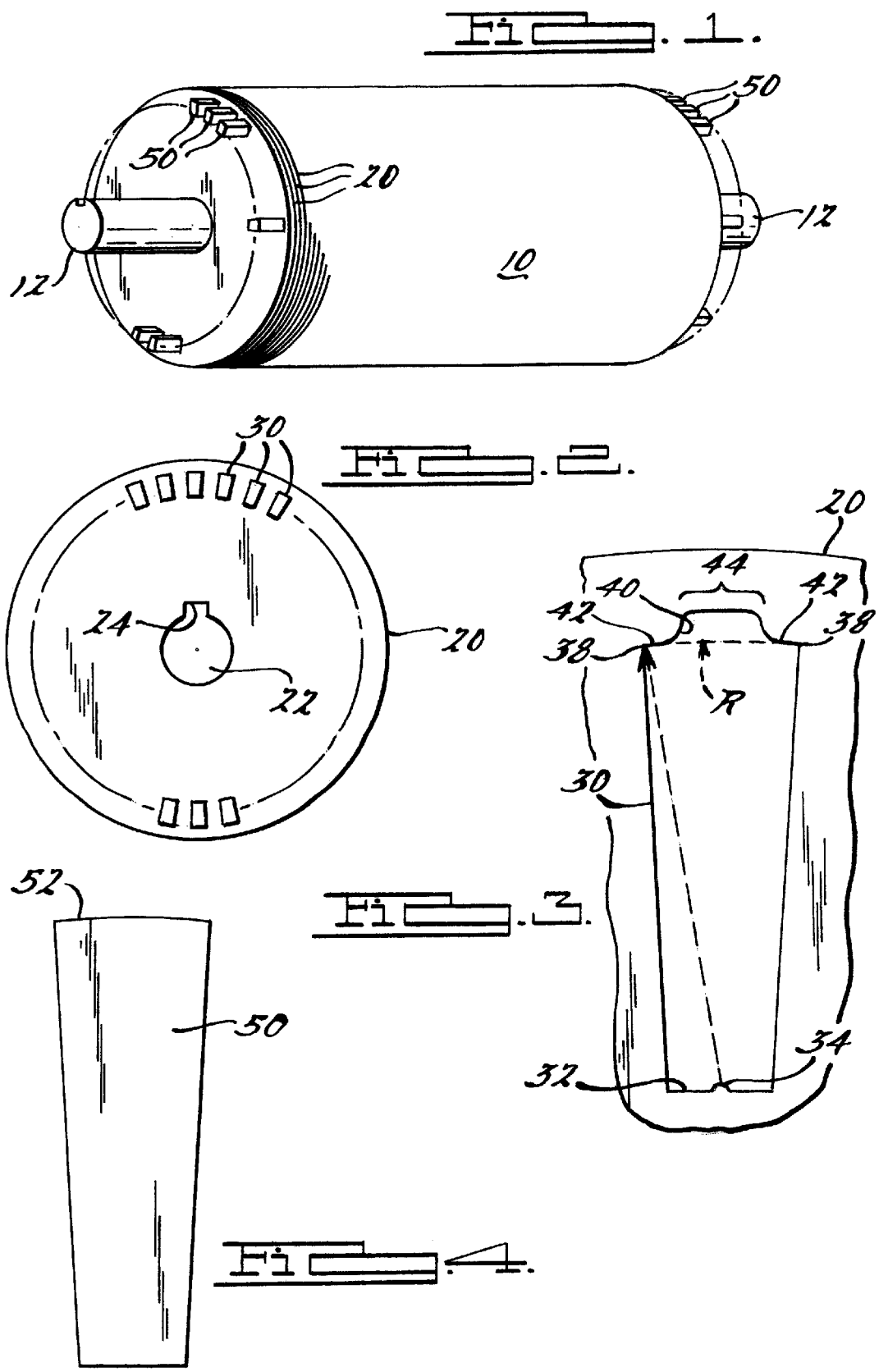

ELECTRIC MOTOR ROTOR

CROSS-REFERENCE TO RELATED APPLICATIONS

The instant application for U.S. Letters Patent claims the benefit of copending U.S. Provisional Application Ser. No. 60/142,368, filed Jul. 6, 1999.

BACKGROUND OF THE INVENTION

The instant invention relates generally to electric motors and more particularly to an improved rotor laminate disc design for an alternating current (AC) induction motor. Large electric motors, for example AC induction motors, employ rotors having a plurality of longitudinal conductive elements, often comprised of copper, copper alloys, or aluminum alloys, radially spaced from a central axis thereof, that operate to enhance the formation of an electromagnetic field therein.

The rotor is comprised of a plurality of thin, coated, electrical steel discs, each having a central aperture therein through which a rotor shaft is pressed. The discs further have a plurality of radially spaced slots therein for the acceptance of longitudinal conductive elements. The discs are stacked and welded or pressed together to form a generally right circular cylindrical assembly, having a central longitudinal aperture therethrough, and a plurality of longitudinal radially spaced slots therein that define longitudinal channels located proximate the periphery of the assembly.

The central aperture of the cylindrical disc assembly is then pressed over a rotor shaft. The conductive elements (hereinafter "bars") are then driven into the longitudinal channels to complete the rotor assembly.

Known-in-the-art motor designs operate most efficiently when the longitudinal conductive bars disposed in the rotor slots are positioned in very close proximity to a stator disposed radially outwardly of said rotor. Stated another way, the slots in each disc are ideally disposed proximate the circumference of the disc, thereby allowing the longitudinal elements to be located as close as possible to the radially outer surface of the rotor. This arrangement of slots and bars therein provides for reduced incidences of magnetic "shorting" that is detrimental to motor efficiency, but requires the portion of each disc radially outward of each slot (the slot "bridge") to bear a large force as the rotor spins.

Prior art rotor designs employing traditional laminated disc slots suffer from a number of disadvantages. Initially, a large number of laminated discs must be stacked to form the rotor assembly, requiring both precise machining of slots in each disc and very precise alignment of each disc in the stack to provide accurate alignment of each slot therein with the slots in the adjacent disc(s). However, imprecise assembly of the laminate stacks in conjunction with variations in slot locations in each disc caused by machining tolerances provide for both radial and tangential offset in the channels formed by the alignment of the slots in each laminate layer. This radial and tangential offset in the corresponding disc slots causes great difficulty in rotor assembly because the conductive bars must be driven into the slot channels using a drift. This technique requires great force to be used to drive the bars completely into the channels, often requiring the use of air hammers.

In addition to making installation of the longitudinal bars difficult, the aforementioned radial and tangential offset causes difficulty in balancing the rotor at high revolutions. In many AC induction motor applications, for example an AC motor driven by a vector drive, it is desirable that the rotor spin at many different angular velocities. This requires a very precisely balanced rotor assembly to avoid excessive vibration, overheating, and damage of sensitive rotor and stator components due to interference. Rotor assemblies having poorly aligned slots or slots having inconsistent shapes are difficult or impossible to balance, and therefore are not suitable for high revolution applications.

Additionally, with conventional laminate slot shapes wherein some offset has occurred during assembly, the longitudinal bars may not contact the radially outward surface of each slot in the assembly. As the rotor spins, the centrifugal force generated by the bars on the slots in contact with the bars is much greater than those not in contact with the bars. In some cases, the bridge over a lamination slot may fail or yield as a result of the excess force placed thereon by the bar.

Furthermore, conventional laminate disc designs employ a relatively large bridge to provide sufficient strength to counterbalance the centrifugal force generated by the bars. However, this relatively large bridge inhibits the propagation of the electromagnetic field in the rotor, thereby decreasing the efficiency of the motor.

SUMMARY OF THE INVENTION

The aforementioned problems are solved by the electric motor rotor laminate disc of the present invention that provides accurate placement of the longitudinal conductive elements (bars) by utilizing a novel laminate disc design that enhances the accuracy of rotor assembly thereby allowing for better rotor balance over a wider rpm range.

Additionally, the laminate disc design of the instant invention provides a plurality of radially spaced slots therein that have a pair of radiused sections on the radially outer edge thereof allowing the longitudinal bars to contact the outer edge of each slot and obviating failure or yield of the slot bridges caused by excessive centrifugal force.

The instant invention employs a reduced bridge center depth allowing for enhanced electromagnetic field strength through the rotor. This feature of the instant invention greatly enhances motor efficiency.

Therefore, one object of the instant invention is a motor rotor that remains balanced over wide RPM ranges and in high RPM applications.

Another object of the instant invention is a rotor utilizing a plurality of novel laminate discs for enhanced accuracy and ease of assembly.

Another object of the instant invention is a laminate disc having a novel slot design to provide enhanced strength and more efficient motor operation.

Additional objects, features, and advantages of the present invention will become apparent from the subsequent detailed description, taken in conjunction with the accompanying drawing figures.

BRIEF DESCRIPTION OF THE DRAWINGS

FIG. 1 is an isometric view of a rotor assembly in accordance with the instant invention.

FIG. 2 is a view of a laminate disc in accordance with the instant invention.

FIG. 3 is a detail view of a single slot in the laminate disc of FIG. 2 in accordance with the instant invention.

FIG. 4 is a view of a conductor bar in accordance with the instant invention.

DETAILED DESCRIPTION OF THE PREFERRED EMBODIMENTS

As shown in FIGS. 1 and 2, an electric motor rotor 10, specifically a rotor 10 employed in known AC induction motors, comprises a plurality of thin laminate discs 20, typically fabricated of coated electrical steel, stacked and welded or pressed together to form a generally right circular cylindrical assembly. As best seen in FIG. 2, each laminate disc 20 has a central aperture 22 therein for acceptance of a rotor shaft 12, and a plurality of slots 30 therein, radially spaced from a central axis thereof. Each disc 20 may also be provided with a keyway 24 therein to aid in alignment with the rotor shaft 12 during assembly. The stacked discs 20 are typically pressed onto the rotor shaft 12 such that the slots 30 in each disc 20 align with the slots 30 in each adjacent disc 20. The aligned slots 30 form a plurality of channels through the rotor 10 for acceptance of a plurality of conductive rotor bars 50, subsequently driven thereinto.

Referring to FIG. 3, and in accordance with a preferred constructed embodiment of the instant invention, each slot 30 has a radially inner surface 32 having a radially outwardly extending tab 34 protruding from the center of the radially inner surface 32. The tab 34 forces a bar 50 inserted into the slot 30 to move radially outwardly, thereby shaping the bottom of the bar 50 by cutting a groove or notch therein if necessary. This feature of the instant invention accommodates dimensional variances in the conductive bars 50 by forcing each bar 50 into a radially identical position with respect to a central axis of the rotor 10. This facilitates balance of the rotor over a large RPM range, even when the slots 30 have a cross-sectional area larger than the cross-section of the bars 50 driven therein.

The radially extending tab 34 provides for ease of rotor assembly because individual conductive bars 50 have minimal contact with the inner surface 32 of the slot 30 because of the radial guidance provided by the tab 34. Since there is less surface to surface contact between a bar 50 and the slots 30, less effort is required to insert a bar 50 into a rotor 10 assembly, in contradistinction with known in the art slot 30 shapes.

The slot 30 further has a radially outer surface 40. The slot tab 34 ensures that the bar 50 is positioned such that its radially outer edge 52 meets the radially outer surface 40, thereby providing accurate positioning of each longitudinal bar 50, as further described hereinbelow.

As best seen in FIG. 3 the radially outer surface 40 of the slot 30 is comprised of a pair of radiused sections 42 and a relieved bridge section 44. The radiused sections 42 have a curvature described by the arc "R" traced by a straight line having a length equal to the distance from the center of the radially inner surface 32 of the slot 30 to one radially outer corner 38 of the slot 30. These radiused sections 42 of each slot 30 prevent intermittent bar 50 contact with the slot radially outer surface 40 regardless of slot 30 indexing error (tangential offsets between adjacent discs) caused by disc 20 stack-up tolerances. This feature of the instant invention significantly reduces stress on the area of each slot 30 between the outer slot surface 40 and the circumference of the disc 20 (the bridge 44) due to a bar 50 only contacting a nominal number of slot outer surfaces 40.

The radiused sections 42 of the outer surface 40 of each slot 30 have a relatively large depth to counter the centrifugal force caused by the conductive bar 50 as the rotor 10 spins. In contradistinction, relieved bridge section 44 provides an area in each slot 30 having a nominal distance between the radially outer edge of the slot 30 and the radially outer edge of the disc 20. This relieved bridge section 44 of each slot enhances magnetic flux density at the outer surfaces of each rotor 10 since the conductive bar 50 outer edge 52 makes no contact with the radially outer surface 40 through the bridge section 44, thereby providing greater efficiency of motor operation.

In an alternative embodiment of the instant invention, the radial height of the tab 34 is equal to the manufacturing variance in the radial dimension of the conductive bars 50, thereby equalizing radial dimensional variances between all conductive bars 50. This feature of the instant invention allows extremely accurate radial location of the conductive bars 50, thereby providing for ease of rotor 10 balance.

While the preferred embodiments of the instant invention have been disclosed in detail, it will be appreciated by one of ordinary skill in the art that the instant invention is susceptible to various modifications without departing from the scope of the claims appended hereto.

I claim:

1. A laminate disc for an electric motor rotor comprising:

a generally circular disc having a central aperture therein for acceptance of a rotor shaft and having a plurality of radially spaced slots therein proximate the circumference of said disc for acceptance of a plurality of conductive rotor bars, each of said slots having a radially inner surface having a radially outwardly extending tab protruding therefrom, and a radially outer surface comprising a pair of radiused sections and a relieved bridge section, wherein said radiused sections have a relatively large depth and said bridge section extends radially outward from but arcuately within said radiused sections, whereby contact between said conductive rotor bars and said bridge section is prevented.

2. A laminate disc as claimed in claim 1 wherein said radially outer slot surface radiused sections have a curvature described by an arc traced by a straight line having a length equal to the distance from the center of the radially inner surface of said slot to a radially outer corner thereof.

3. A laminate disc as claimed in claim 1 wherein the relieved bridge section of said slot extends radially outwardly to a point proximate the circumference of said disc.

4. A laminate disc as claimed in claim 1 wherein the radial height of the radially outwardly extending tabs is equal to the radial dimensional variance of said plurality of conductive rotor bars.

5. A laminate disc for an electric motor rotor comprising:

a generally circular disc having a central aperture therein for acceptance of a rotor shaft and having a plurality of radially spaced slots therein proximate the circumference of said disc for acceptance of a plurality of conductive rotor bars, each of said slots having a radially inner surface having a radially outwardly extending tab protruding therefrom, and a radially outer surface comprising a pair of radiused sections and a relieved bridge section, wherein said radially outer slot surface radiused sections have a curvature described by an arc traced by a straight line having a length equal to the distance from the center of the radially inner surface of said slot to a radially outer corner thereof.

6. A laminate disc for an electric motor rotor comprising:

a generally circular disc having a central aperture therein for acceptance of a rotor shaft and having a plurality of radially spaced slots therein proximate the circumference of said disc for acceptance of a plurality of conductive rotor bars, each of said slots having a radially inner surface having a radially outwardly extending tab protruding therefrom, and a radially outer surface comprising a pair of radiused sections and a relieved bridge section, wherein the radial height of the radially outwardly extending tabs is equal to the radial dimensional variance of said plurality of conductive rotor bars.

\* \* \* \* \*